US012377876B2

(12) United States Patent
Wiberg et al.

(10) Patent No.: US 12,377,876 B2
(45) Date of Patent: Aug. 5, 2025

(54) METHOD FOR PLANNING A DRIVING TRAJECTORY DEFINING A TRAVELLING PATH FOR A VEHICLE

(71) Applicant: Volvo Autonomous Solutions AB, Gothenburg (SE)

(72) Inventors: Wilhelm Wiberg, Askim (SE); Oskar Ljungqvist, Sätila (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 327 days.

(21) Appl. No.: 18/057,015

(22) Filed: Nov. 18, 2022

(65) Prior Publication Data
US 2023/0159055 A1 May 25, 2023

(30) Foreign Application Priority Data

Nov. 22, 2021 (EP) .................................. 21209517

(51) Int. Cl.
*B60W 60/00* (2020.01)
*B60W 40/02* (2006.01)
*B60W 40/12* (2012.01)

(52) U.S. Cl.
CPC ........ *B60W 60/0011* (2020.02); *B60W 40/02* (2013.01); *B60W 40/12* (2013.01); *B60W 60/0015* (2020.02); *B60W 2554/40* (2020.02)

(58) Field of Classification Search
CPC .. B60W 60/0011; B60W 40/02; B60W 40/12; B60W 60/0015; B60W 2554/40;
(Continued)

(56) References Cited

U.S. PATENT DOCUMENTS 8,798,841 B1    8/2014  Nickolaou et al.
10,040,450 B1*  8/2018  Pal ..................... B60W 60/0011
(Continued)

FOREIGN PATENT DOCUMENTS

CN    111522350 A    8/2020
DE    102018217746 A1    4/2020

OTHER PUBLICATIONS

Extended European Search Report in corresponding European Application No. 21209517.8 dated Jul. 12, 2022 (8 pages).
(Continued)

*Primary Examiner* — Abby Y Lin
*Assistant Examiner* — Kayla R. Doros
(74) *Attorney, Agent, or Firm* — Venable LLP; Jeffri A. Kaminski

(57) ABSTRACT

A method for planning a driving trajectory defining a travelling path for a vehicle, wherein the driving trajectory is intended to be followed by executing one or more vehicle manoeuvres and wherein the vehicle comprises at least one environment perception sensor having a sensor field of view he method includes planning the driving trajectory from a first point to a second point, by including at least one additional vehicle manoeuvre resulting in a deviation from an otherwise expected travelling path from the first point to the second point, so that each section of an area which the vehicle is intended to pass from the first point to the second point is covered in the sensor field of view at least one time during driving from the first point to the second point and at least before passing each respective section.

17 Claims, 3 Drawing Sheets

(58) Field of Classification Search
CPC ..... B60W 30/18036; B60W 2300/125; B60W 10/20; B60W 30/06; B60W 2420/403; G01C 21/3415; B62D 15/0285; G05D 1/0212; G01S 13/931; G01S 13/89; B60K 2360/173

See application file for complete search history.

(56) References Cited

U.S. PATENT DOCUMENTS

| | | | |
|---|---|---|---|
| 10,108,194 B1* | 10/2018 | Russell | G05D 1/0212 |
| 2020/0117204 A1* | 4/2020 | Lindemann | B60L 53/63 |
| 2020/0379465 A1 | 12/2020 | Adam et al. | |
| 2021/0316763 A1* | 10/2021 | Domahidi | B60W 40/105 |

OTHER PUBLICATIONS

Young-Woo Seo et al; "A perception mechanism for supporting autonomous intersection handling in urban driving"; Conference Paper, Proceedings of (IROS) IEEE/RSJ International Conference on Intelligent Robots and Systems, pp. 1830-1835, Acropolis Convention Center, Nice, France, Sep. 22-26, 2008 (6 pages).

* cited by examiner

METHOD FOR PLANNING A DRIVING TRAJECTORY DEFINING A TRAVELLING PATH FOR A VEHICLE

TECHNICAL FIELD

The invention relates to a method for planning a driving trajectory defining a travelling path for a vehicle. The invention further relates to a processing unit for planning a driving trajectory, to a method for automatically driving a vehicle along a driving trajectory, to a control unit for automatically driving a vehicle along a driving trajectory, to a vehicle, and to a computer program and a computer readable medium.

The invention can be applied in heavy-duty vehicles, such as trucks, buses and construction equipment. Although the invention will be described with respect to a truck, the invention is not restricted to this particular vehicle, but may also be used in other vehicles such as passenger cars.

BACKGROUND

An autonomous vehicle, or semi-autonomous vehicle, may be defined as a vehicle which can drive automatically, or at least partly automatically, along a driving trajectory which defines a travelling path for the vehicle. One or more vehicle manoeuvres are executed in order to follow the driving trajectory. The vehicle manoeuvres are executed by use of one or more actuators of the vehicle. The one or more actuators may be at least one of a steering actuator for controlling steering of the vehicle, a braking actuator for controlling braking of the vehicle, and a propulsion actuator for controlling propulsion of the vehicle.

In order to follow the driving trajectory and to ensure that the path is drivable, the vehicle is typically equipped with one or more environment perception sensors. An environment perception sensor has a sensor field of view, which e.g. may be defined by a maximum detection distance and a maximum angle of view.

When executing a driving mission, by automatically driving from one point to another point, it is important that the area the vehicle will pass, or traverse, is observed in advance by the one or more environment perception sensors. Otherwise, there is a significant risk that the vehicle will collide with an obstacle and/or drive over an undrivable area.

In order to reduce this risk, it is known to equip the vehicle with several environment perception sensors so that all areas around the vehicle can be observed during driving.

In view of the above, there is a strive to develop improved technology which takes the above issues into account.

SUMMARY

An object of the invention is to provide a method for planning a driving trajectory defining a travelling path for a vehicle, which at least partly overcomes one or more drawbacks of the prior art, or which at least provides a suitable alternative. Another object is to provide a method for automatically driving a vehicle along a driving trajectory, which at least partly overcomes one or more drawbacks of the prior art, or which at least provides a suitable alternative. Yet further objects are to provide a processing unit, a control unit, a vehicle, a computer program and/or a computer readable medium, which at least partly overcomes one or more drawbacks of the prior art, or which at least provides a suitable alternative.

Thus, there is provided a method for planning a driving trajectory defining a travelling path for a vehicle, wherein the driving trajectory is intended to be followed by executing one or more vehicle manoeuvres and wherein the vehicle comprises at least one environment perception sensor having a sensor field of view.

The method comprises:

planning the driving trajectory from a first point to a second point, by including at least one additional vehicle manoeuvre resulting in a deviation from an otherwise expected travelling path from the first point to the second point, so that each section of an area which the vehicle is intended to pass from the first point to the second point is covered in the sensor field of view at least one time during driving from the first point to the second point and at least before passing each respective section.

An expected travelling path is herein intended to mean a fastest and/or shortest possible travelling path between one point to another point, e.g. between the first point and the second point.

Each section of the area which the vehicle is intended to pass may be defined as a section which at least one portion of the vehicle will drive over, or traverse, when driving along the driving trajectory. In other words, the sections of the area which the vehicle is intended to pass define a swept area for the vehicle, i.e. an area which the vehicle will sweep over when driving from one point to another point. By way of example, when driving along a curved path, a transverse extension of the vehicle's swept area will likely be larger than a transverse extension of the vehicle's swept area when driving along a straight non-curved path. A transverse extension is here an extension which is perpendicular to a longitudinal extension of the vehicle. For example, a vehicle with a large wheel base will typically have a larger swept area during cornering compared to a vehicle with a smaller wheel base.

By the provision of a method for planning a driving trajectory as disclosed herein, a driving trajectory will be planned which takes the limitations of the at least one environment perception sensor into account. Thereby, fewer sensors may be used, and/or less advanced sensors may be used which e.g. have a more limited field of view. Accordingly, by the provision of the method according to the first aspect, a more cost-efficient sensor set up for the vehicle can be used without compromising with safety during driving. More specifically, it has been realized that planning the driving trajectory by including at least one additional vehicle manoeuvre as mentioned herein, the limitations of the at least one environment perception sensor's field of view will be considered so that all sections of the area the vehicle will pass is covered in the sensor's field of view at least one time before the vehicle passes each respective section. For example, by the provision of the method, the vehicle may only require to be equipped with at least one forward looking environment perception sensor. As such, other environment perception sensors, such as transverse looking sensors and/or rearward looking sensors may be omitted, implying reduced cost. A transverse extension, or direction, as used herein is perpendicular to a longitudinal extension of the vehicle which corresponds to a forward or rearward travelling direction of the vehicle.

Optionally, the first point may be defined by a start position and orientation of the vehicle and the second point may be defined by an end position and orientation of the vehicle. A position and orientation may also refer to a pose of the vehicle. Thereby, by knowing the start pose and the intended end pose of the vehicle, the driving trajectory can be planned in a more optimal manner so that all sections of the area will be covered in the sensor field of view at least one time during driving from the first point to the second point and at least before passing each respective section. For example, reaching the end pose may require performing a number of space consuming vehicle manoeuvres. Thereby, by knowing the intended end pose when planning the driving trajectory from the start pose, the driving trajectory can be planned in a more optimal manner, i.e. as fast and/or as short as possible between the first and second point, while also ensuring that all sections of the area will be covered in the sensor field of view at least one time during driving from the first point to the second point and at least before passing each respective section.

Purely by way of example, the vehicle may be a vehicle combination comprising at least two vehicle units which are connected in series via a respective articulation joint. As such, the position and orientation, or pose, of the vehicle may be defined as the position and orientation of each vehicle unit of the vehicle combination. By knowing the start position and orientation and the end position and orientation of each vehicle unit, the driving trajectory can be planned in a more optimal manner, i.e. as fast and/or as short as possible between the first and second point, while also ensuring that all sections of the area will be covered in the sensor field of view at least one time during driving from the first point to the second point and at least before passing each respective section.

Optionally, the driving trajectory may be planned so that also at least one safety margin section associated with at least one of the respective sections is also covered in the sensor field of view at least one time during driving from the first point to the second point and at least before passing the at least one of the respective sections. Thereby, possible obstacles which are close to the travelling path may be detected in advance. Such obstacles may be movable obstacles, for example vulnerable road users (VRU). Thereby, by also covering one or more safety margin sections in advance, possible collisions with the obstacles can be avoided, implying safer travelling between the first and second points.

Optionally, the method may further comprise:
in response to finding two or more possible driving trajectories from the first point to the second point, the method further comprises choosing the fastest and/or shortest driving trajectory from the first point to the second point from the two or more possible driving trajectories.

Thereby, unnecessary additional driving manoeuvres can be avoided, implying a safe and time efficient driving trajectory.

Optionally, the method may further comprise:
during driving along the planned driving trajectory, replanning the driving trajectory when it is determined that a predetermined time period has lapsed since a last time at least one section of the area which the vehicle is intended to pass was covered in the sensor field of view.

Thereby, a safer travelling from the first to the second point can be achieved. More particularly, by replanning the driving trajectory if the predetermined time period has lapsed, the risk of colliding with a movable obstacle, such as a VRU, can be reduced.

Still optionally, replanning the driving trajectory may comprise including at least one further additional vehicle manoeuvre resulting in a deviation from the planned driving trajectory, i.e. the initially planned driving trajectory, so that the at least one section of the area which the vehicle is intended to pass is covered in the sensor field of view at least one further time before passing the at least one section. As another example, replanning the driving trajectory may comprise planning for an immediate stop of the vehicle to a standstill. Thereby, the risk of a possible collision can be reduced, or avoided.

Optionally, each section of the area which the vehicle is intended to pass from the first point to the second point may be considered to be covered in the sensor field of view at least one time when each section has been viewed during a predetermined viewing time period of the at least one environment perception sensor and/or when each section has been viewed within a predetermined distance from the at least one environment perception sensor. Thereby, a safer operation of the vehicle when driving from the first point to the second point may be achieved. In particular, by using the above conditions, a low confidence of the at least one sensor's perception of the environment can be avoided.

Optionally, the method may further comprise:
in response to determining during driving along the planned driving trajectory that at least one section of the area which the vehicle is intended to pass from the first point to the second point comprises an obstacle, replanning the driving trajectory, by including at least one further additional vehicle manoeuvre deviating from the planned driving trajectory so that the obstacle is avoided.

Thereby, the risk of collisions will be reduced, or avoided. The at least one further additional vehicle manoeuvre for avoiding the obstacle may be one or more vehicle manoeuvres which allows the vehicle to pass by the obstacle, and thereafter returning to the already planned driving trajectory. As another example, the at least one further additional vehicle manoeuvre for avoiding the obstacle may be one or more vehicle manoeuvres which immediately stops the vehicle to a standstill without colliding with the obstacle.

Optionally, the driving trajectory may further be replanned so that each further section of a further area which the vehicle is intended pass as a consequence of the at least one further additional vehicle manoeuvre is covered in the sensor field of view at least one time before and/or during execution of the at least one further vehicle manoeuvre and at least before passing each respective further section.

Thereby, it can be ensured that the vehicle, during execution of the at least one further additional vehicle manoeuvre, will not pass any further section of the further area which has not already been covered in the sensor field of view. This implies a safe operation, reducing the risk of colliding with further obstacles, when the driving trajectory is replanned due to a detected obstacle interfering with the planned driving trajectory.

Optionally, the one or more vehicle manoeuvres may comprise at least one forward moving vehicle manoeuvre and at least one reverse moving vehicle manoeuvre. It has been realized that the method according to the first aspect of the invention may be especially advantageous when the vehicle manoeuvres comprise at least one forward moving vehicle manoeuvre and at least one reverse moving vehicle manoeuvre. For example, in the event the vehicle only comprises one or more forward looking environment perception sensors, the forward looking environment perception sensor(s) will likely not be able to see the area behind the vehicle during reversing. As such, by planning the driving trajectory by including at least one additional vehicle manoeuvre as disclosed herein, the areas along the trajectory which are not perceived by the sensor(s) during reversing will instead be perceived by the sensors in advance. Thereby, a safe operation of the vehicle is achieved in a cost-efficient manner, i.e. without the need of reverse looking environment perception sensors. Accordingly, by way of example, the vehicle may only be equipped with one or more environment perception sensors which are directed in one travelling direction, i.e. either in the forward or reverse travelling direction.

Still further, a vehicle manoeuvre associated with starting driving from the first point may be a forward moving vehicle manoeuvre and a vehicle manoeuvre associated with reaching the second point may be a reverse moving vehicle manoeuvre, or vice versa. More particularly, by the method according to the first aspect of the invention, the vehicle may only require to be equipped with either forward or reverse looking environment perception sensors, implying reduced cost, and still be able to at least in advance cover the sections of the area the vehicle will pass during driving along the driving trajectory.

Optionally, the driving trajectory may further be planned by defining an additional travelling path for the vehicle from the second point to a third point, wherein the driving trajectory is further planned, by including a vehicle manoeuvre while driving from the first point to the second point, so that each section of an area which the vehicle is intended to pass from the second point to the third point is covered in the sensor field of view at least one time during driving from the first point to the second point. Thereby, a more proactive approach may be achieved, in which the driving trajectory from the second point to the third point will be covered by the sensor(s) field of view already when driving from the first point to the second point. This implies a more optimal driving trajectory from the second point to the third point, such as an otherwise expected travelling path from the second point to the third point. Thereby, a faster and/or shorter driving trajectory may be achieved.

Thus, there is provided a processing unit for planning a driving trajectory defining a travelling path for a vehicle, wherein the driving trajectory is intended to be followed by execution of one or more vehicle manoeuvres and wherein the vehicle comprises at least one environment perception sensor having a sensor field of view. The processing unit is configured to perform the steps of the method according to any one of the embodiments of the first aspect of the invention.

Advantages and effects of the second aspect of the invention are largely analogous to the advantages and effects of the first aspect of the invention.

According to a third aspect of the invention, at least one of the objects is at least partly achieved by a method according to claim 14.

Thus, there is provided a method for automatically driving a vehicle along a driving trajectory defining a travelling path for the vehicle, wherein the vehicle comprises at least one environment perception sensor having a sensor field of view. The method comprises:

executing one or more vehicle manoeuvres to follow the driving trajectory, wherein the driving trajectory is planned by a method according to any one of the embodiments of the first aspect of the invention.

Advantages and effects of the third aspect of the invention are largely analogous to the advantages and effects of the first aspect of the invention.

Thus, there is provided a control unit for automatically driving a vehicle along a driving trajectory defining a travelling path for the vehicle, wherein the vehicle comprises at least one actuator for executing vehicle manoeuvres and at least one environment perception sensor having a sensor field of view. The control unit is configured to issue one or more control signals to the at least one actuator so that the at least one actuator executes one or more vehicle manoeuvres to follow the driving trajectory, wherein the driving trajectory is planned by a processing unit according to any one of the embodiments of the second aspect of the invention.

Advantages and effects of the fourth aspect of the invention are largely analogous to the advantages and effects of the first and third aspects of the invention.

The processing unit and the control unit as disclosed herein may be the same unit, or they may be different separate units. For example, at least one of the processing unit and the control unit may be a vehicle on-board unit or a vehicle off-board, or remote, unit.

The processing unit and/or the control unit may be formed as one single unit or, the processing unit and/or the control unit may be formed by two or more communicatively connected sub-units.

The processing unit and/or the control unit may include a microprocessor, microcontroller, programmable digital signal processor or another programmable device. The processing unit and/or control unit may also, or instead, include an application specific integrated circuit, a programmable gate array or programmable array logic, a programmable logic device, or a digital signal processor. Where the processing unit and/or control unit include(s) a programmable device such as the microprocessor, microcontroller or programmable digital signal processor mentioned above, the processor may further include computer executable code that controls operation of the programmable device. The processing unit and/or control unit may comprise embedded hardware, sometimes with integrated software, where the hardware show close physical relationship. Examples of physical relationships are: shared casing and components mounted on one or several circuit boards.

Thus, there is provided a vehicle comprising at least one environment perception sensor having a sensor field of view. The vehicle further comprises a processing unit according to any one of the embodiments of the second aspect of the invention and/or a control unit according to any one of the embodiments of the fourth aspect of the invention, and/or the vehicle is adapted to be in communicative contact with a processing unit according to any one of the embodiments of the second aspect of the invention and/or with a control unit according to any one of the embodiments of the fourth aspect of the invention.

Advantages and effects of the fifth aspect of the invention are largely analogous to the advantages and effects of the first, second, third and fourth aspects of the invention.

The vehicle may be any kind of vehicle, such as a truck, a construction equipment vehicle and a bus. For example, the vehicle may be a vehicle combination comprising two or more vehicle units which are connected in series via a respective articulation joint.

Thus, there is provided a computer program comprising program code means for performing the method of any embodiment of the first aspect of the invention and/or the third aspect of the invention when said program is run on a computer, such as on the processing unit according to the second aspect of the invention and/or the control unit according to the fourth aspect of the invention.

Thus, there is provided a computer readable medium carrying a computer program comprising program code means for performing the method of any embodiment of the first aspect of the invention and/or the third aspect of the invention when said program product is run on a computer, such as on the processing unit according to the second aspect of the invention and/or the control unit according to the fourth aspect of the invention.

It shall be noted that all embodiments of any aspect of the invention are combinable with all embodiments of any other aspect of the invention, and vice versa.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
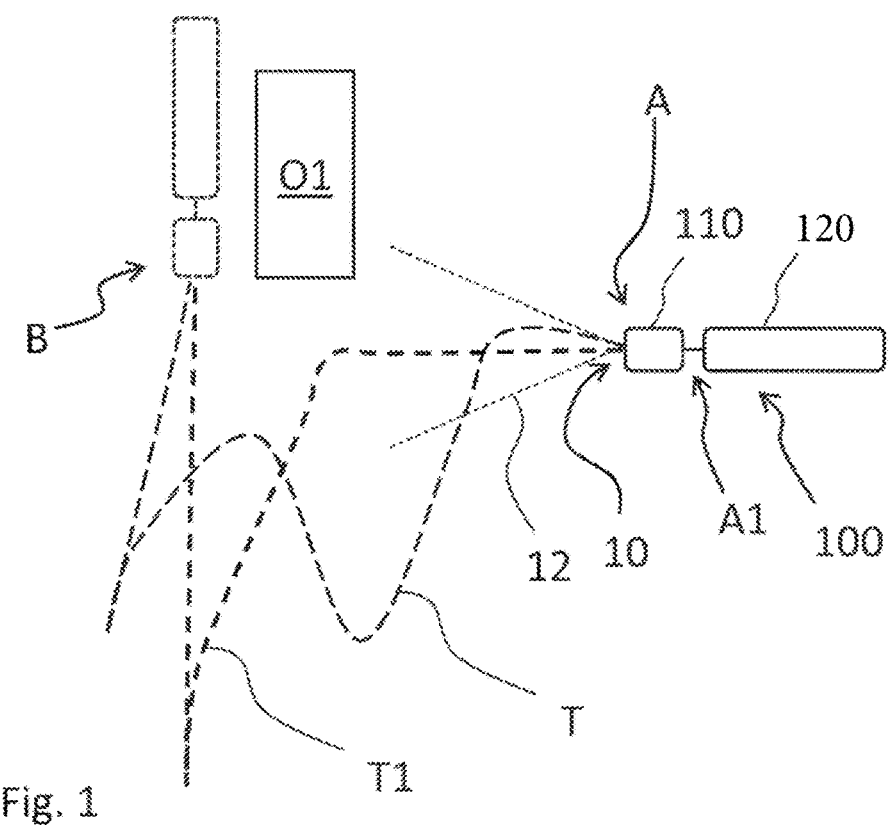
FIG. 1 is a schematic view from above of a vehicle which is about to drive from a first point to a second point by following a driving trajectory which is planned according to an example embodiment of the present invention.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters refer to like elements throughout the description, unless expressed otherwise.

DETAILED DESCRIPTION OF EXAMPLE EMBODIMENTS OF THE INVENTION

With reference to FIG. 1, a schematic view from above is depicted of an area in which a vehicle 100 is about to drive from a first point A to a second point B by following a driving trajectory T.

The vehicle 100 may be any kind of vehicle, such as a truck, a bus and a construction equipment vehicle, e.g. a wheel loader, an excavator etc. As shown, the vehicle 100 may be a vehicle combination comprising a first vehicle unit 110 and a second vehicle unit 120 which are connected in series via an articulation joint A1. It shall be understood that the vehicle combination may comprise any number of vehicle units which are connected in series via respective articulation joints. The vehicle unit 110 can be pivoted with respect to the vehicle unit 120 at the articulation joint A1.

Figure 4:
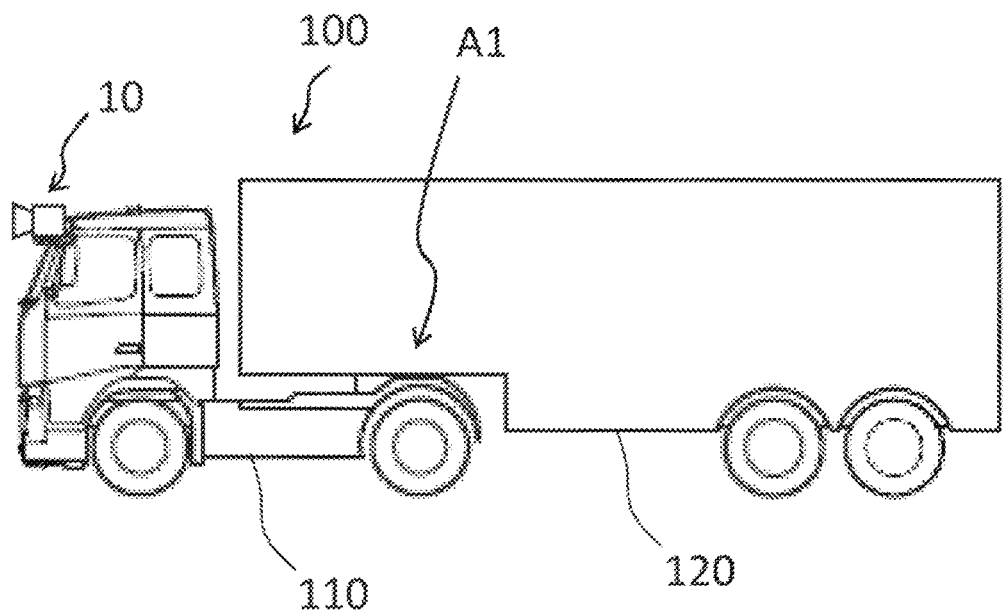
FIG. 4 is a side view of a vehicle according to an example embodiment of the present invention.

An example of such a vehicle is shown in FIG. 4. The vehicle 100 in FIG. 4 comprises a first vehicle unit 110, in this case a towing truck, which is connected in series via a joint A1 with a second vehicle unit 120, in this case a trailer.

Furthermore, the vehicle 100 comprises at least one environment perception sensor 10 which has a sensor field of view 12. The sensor field of view 12 is in FIG. 1 indicated by a specific view angle, or angle of view. It shall however be understood that the environment perception sensor 10 in this case also has a specific maximum detection distance, i.e. a maximum distance from which the environment perception sensor 10 can detect e.g. an obstacle. As shown, the environment perception sensor 10 may be a forward looking perception sensor, corresponding to a forward driving direction of the vehicle 100.

FIG. 1 further shows an obstacle O1 in the area where the vehicle 100 is intended to be driven. As indicated, the obstacle O1 will occlude the second point B when the vehicle 100 is at the first point A.

In addition to the driving trajectory T from the first point A to the second point B, another driving trajectory T1 is depicted. T1 represents a normal situation, e.g. a situation when e.g. a driver of the vehicle 100 would drive from the first point A to the second point B. The driving trajectory T1 may be referred to as an expected travelling path for the vehicle 100, i.e. a fastest and/or shortest possible travelling path between the first point A and the second point B. In the shown situation, the vehicle 100 will start driving in a forward direction from the first point A, and thereafter take a left turn in order to position the vehicle 100 so that it can finally be reversed to the second point B.

With the current sensor set up, i.e. a forward looking environment perception sensor 10, the environment perception sensor 10 will not be able to view the second point B when the vehicle 100 is reversing towards the second point B along the driving trajectory T1. Instead, in the normal driving situation, the driver would typically use rear-view mirrors when reversing towards the second point B.

According to the first aspect of the invention, a driving trajectory T could be planned instead of the driving trajectory T1 so that the field of view 12 of the forward looking perception sensor 10 will be able to cover all sections of the area the vehicle 100 will pass at least one time before passing each section.

Figure 5A:
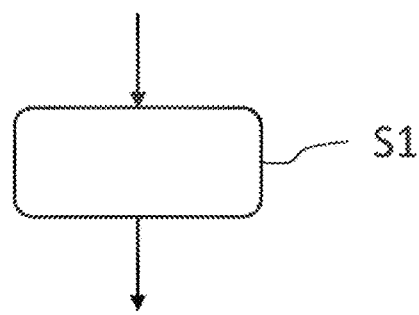
FIGS. 5a-b are flowcharts of methods according to example embodiments of the present invention.

As such, with reference to FIG. 1 and FIG. 5a, a method for planning a driving trajectory T defining a travelling path for the vehicle 100 according to an embodiment if the first aspect of the invention is depicted.

The driving trajectory T is intended to be followed by executing one or more vehicle manoeuvres. Preferably, the vehicle manoeuvres are automatic, i.e. they may not require direct input from an on-board and/or an off board driver. Instead, the vehicle manoeuvres may be performed automatically by a control unit 30 (see FIG. 3) issuing instructions to one or more actuators (not shown) for controlling at least one of steering, propulsion and braking of the vehicle 100.

The method comprises:

S1: planning the driving trajectory T from a first point A to a second point B, by including at least one additional vehicle manoeuvre resulting in a deviation from an otherwise expected travelling path T1 from the first point A to the second point B, so that each section of an area which the vehicle 100 is intended to pass from the first point A to the second point B is covered in the sensor field of view 12 at least one time during driving from the first point A to the second point B and at least before passing each respective section.

As shown in the example in FIG. 1, the driving trajectory T may be planned so that the vehicle 100 will start driving in a forward direction from the first point A and shortly thereafter take a left turn. Thereafter, the driving trajectory T is planned so that the vehicle 100 will take a right turn so that the second point B is covered in the sensor field of view 12. After the right turn, the vehicle will again take a left turn in order to position the vehicle 100 so that the vehicle 100 thereafter can reverse towards the second point B. Thereby, the driving trajectory T is planned so that each section of an area which the vehicle 100 is intended to pass from the first point A to the second point B is covered in the sensor field of view 12 at least one time during driving from the first point A to the second point B and at least before passing each respective section.

As can be understood, the second point B is here a point which the vehicle 100 is intended to reach by a final reversing manoeuvre. For example, the second point B may correspond to a loading/unloading position for the vehicle 100. For example, the rear side of the vehicle 100 may at the point B be pointing towards a loading/unloading bay.

The first point A may be defined by a start position and orientation of the vehicle 100 and the second point B may be defined by an end position and orientation of the vehicle 100. The position may for example be expressed as coordinates in a coordinate system. The orientation may be defined as an orientation of a longitudinal axis of the vehicle 100 with respect to a reference. Alternatively, the orientation may be defined as an orientation of a longitudinal axis of the first vehicle unit 110 and by an orientation of a longitudinal axis of the second vehicle unit 120. The position and orientation may as mentioned in the above also be denoted as a pose. A start position at a first point as used herein should be interpreted broadly. Hence, it may not only be an actual start position for the vehicle when it starts from standstill. Accordingly, by way of example, the start position may only be regarded as a position wherefrom the trajectory is planned.

Furthermore, the driving trajectory T may be planned so that also at least one safety margin section associated with at least one of the respective sections is also covered in the sensor field of view 12 at least one time during driving from the first point A to the second point B and at least before passing the at least one of the respective sections.

When planning the driving trajectory T, more than one possible driving trajectory may be found. As such, in response to finding two or more possible driving trajectories from the first point A to the second point B, the method may further comprise choosing the fastest and/or shortest driving trajectory T from the first point A to the second point B from the two or more possible driving trajectories. For example, another found possible driving trajectory (not shown) could be a driving trajectory including further left and right turns. However, such driving trajectory would be longer and slower.

The method may further comprise:
during driving along the planned driving trajectory T, replanning the driving trajectory T when it is determined that a predetermined time period has lapsed since a last time at least one section of the area which the vehicle 100 is intended to pass was covered in the sensor field of view 12.

Accordingly, if the vehicle 100, for some reason, drives too slow along the driving trajectory T, a predetermined time period may have lapsed since a last time at least one section of the area which the vehicle 100 is intended to pass was covered in the sensor field of view 12. Thereby, if a time period has lapsed which is longer than the predetermined time period, the driving trajectory T may be replanned. For example, replanning the driving trajectory T may comprise including at least one further additional vehicle manoeuvre (not shown) resulting in a deviation from the planned driving trajectory T so that the at least one section of the area which the vehicle 100 is intended to pass is covered in the sensor field of view 12 at least one further time before passing the at least one section.

Moreover, each section of the area which the vehicle 100 is intended to pass from the first point A to the second point B may be considered to be covered in the sensor field of view 12 at least one time when each section has been viewed during a predetermined viewing time period of the at least one environment perception sensor 10 and/or when each section has been viewed within a predetermined distance from the at least one environment perception sensor 10.

Furthermore, during driving along the planned driving trajectory T, it may be determined that at least one section of the area which the vehicle 100 is intended to pass from the first point A to the second point B comprises an obstacle. The obstacle may be detected by use of the at least one perception sensor 10. Additionally, or alternatively, the obstacle may be determined by the vehicle 100 receiving information from a remote unit that an obstacle is present along the planned driving trajectory T. For example, the obstacle may be a movable obstacle such as a VRU or another vehicle.

As such, in response to determining during driving along the planned driving trajectory T that at least one section of the area which the vehicle 100 is intended to pass from the first point A to the second point B comprises an obstacle, the method comprises replanning the driving trajectory T, by including at least one further additional vehicle manoeuvre deviating from the planned driving trajectory T so that the obstacle is avoided.

Furthermore, the driving trajectory T may further be replanned so that each further section of a further area which the vehicle 100 is intended to pass as a consequence of the at least one further additional vehicle manoeuvre is covered in the sensor field of view 12 at least one time before and/or during execution of the at least one further additional vehicle manoeuvre and at least before passing each respective further section.

As mentioned in the above, the one or more vehicle manoeuvres may comprise at least one forward moving vehicle manoeuvre and at least one reverse moving vehicle manoeuvre. As further mentioned in the above, a vehicle manoeuvre associated with starting driving from the first point A may be a forward moving vehicle manoeuvre and a vehicle manoeuvre associated with reaching the second point B may be a reverse moving vehicle manoeuvre. It could also be vice versa, i.e. a vehicle manoeuvre associated with starting driving from the first point A may be a reverse moving vehicle manoeuvre and a vehicle manoeuvre associated with reaching the second point B may be a forward moving vehicle manoeuvre.

The vehicle 100 may be configured to receive information about a driving mission from the first point A to another point, such as to the second point B. The driving mission may typically include a desired position and orientation for the vehicle 100 at the second point B. Accordingly, in response to receiving the driving mission, the driving trajectory T may be planned as disclosed herein. Additionally, or alternatively, the driving trajectory T may be planned off-board the vehicle 100, i.e. a planned driving trajectory T may be communicated to the vehicle 100.

In view of the above, the vehicle 100 may comprise communication means (not shown) for communicating with a remote unit, such as a remote server (not shown). The communication means may be wired and/or wireless.

Figure 2:
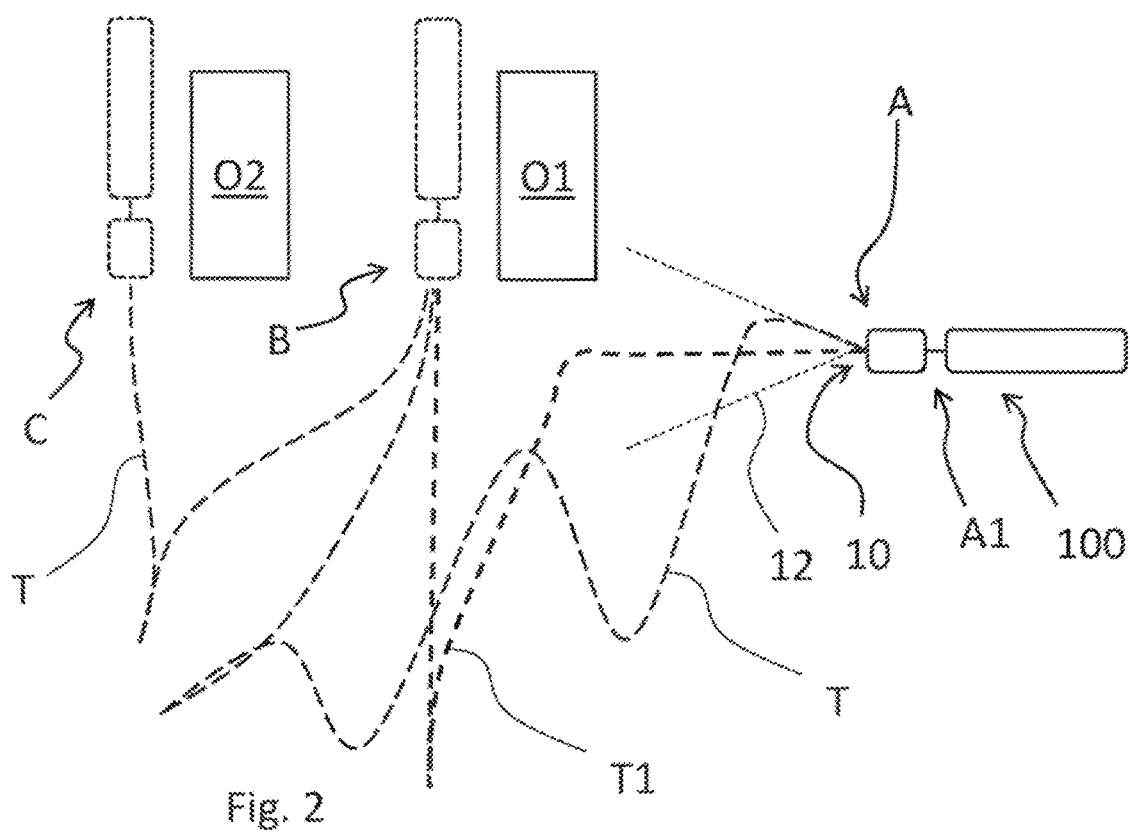
FIG. 2 is a schematic view from above of a vehicle which is about to drive from a first point to a second point, and from the second point to a third point, by following a driving trajectory which is planned according to an example embodiment of the present invention.

With reference to FIG. 2, another embodiment of the first aspect of the invention is shown. In the shown embodiment, the vehicle 100 is first intended to drive from the first point A to the second point B. Thereafter, the vehicle 100 is intended to drive from the second point B to a third point C. The vehicle 100 is here intended to reach each point, B and C, by a final reverse vehicle manoeuvre. The third point C is here occluded by an obstacle O2, as seen from the first point A. The obstacles O1, O2 may for example be static objects, such as buildings, walls, hills etc.

As indicated in FIG. 2, the driving trajectory T may be further planned by defining an additional travelling path for the vehicle 100 from the second point B to the third point C. The driving trajectory T is further planned by including a vehicle manoeuvre while driving from the first point A to the second point B, so that each section of an area which the vehicle 100 is intended to pass from the second point B to the third point C is covered in the sensor field of view 12 at least one time during driving from the first point A to the second point B. In the shown embodiment, a further additional vehicle manoeuvre is performed while driving from the first point A to the second point B. In this example, the further additional vehicle manoeuvre comprises performing a further right and left turn before reversing to the second point B. As a consequence, the portion of the driving trajectory T from the second point B to the third point C can be made more efficient, i.e. faster and/or shorter. For example, as shown in FIG. 2, the portion of the driving trajectory T from the second point B to the third point C may rather correspond to an otherwise expected travelling path from the second point B to the third point C. By the further additional vehicle manoeuvre as shown in FIG. 2, each section of an area which the vehicle 100 is intended to pass from the second point B to the third point C will be covered in the sensor field of view 12 at least one time during driving from the first point A to the second point B.

Figure 3:
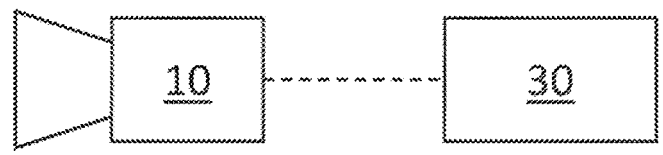
FIG. 3 is a schematic view of an environment perception sensor and a processing unit and/or control unit according to an example embodiment of the present invention.

With reference to FIG. 3, a processing unit 30 for planning a driving trajectory T defining a travelling path for a vehicle 100 is shown. The processing unit 30 is in the shown embodiment in communicative contact with the environment perception sensor 10 of the vehicle 100. The processing unit 30 is configured to perform the steps of the method according to any one of the embodiments of the first aspect of the invention. It shall be noted that the processing unit 30 does not necessarily need to be in communicative contact with the environment perception sensor 10. For the processing unit 30 being able to perform the method, it may for example suffice to have information about the position and view direction of the at least one environment perception sensor 10, information about the area where the vehicle 100 is intended to drive, and information about the first and second points A, B.

The processing unit 30 may be a vehicle on-board unit and/or an off-board unit.

Figure 5B:
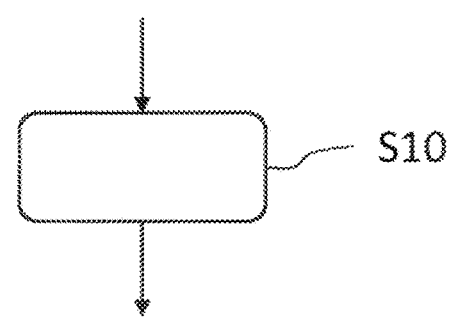

According to the third aspect, the invention further relates to a method for automatically driving a vehicle 100 along a driving trajectory T defining a travelling path for the vehicle 100, wherein the vehicle 100 comprises at least one environment perception sensor 10 having a sensor field of view 12. A flowchart of an example embodiment of such a method is shown in FIG. 5b. The method comprises:

S10: executing one or more vehicle manoeuvres to follow the driving trajectory T, wherein the driving trajectory T is planned by a method according to any one of the embodiments of the first aspect of the invention.

According to the fourth aspect, the invention also relates to a control unit 30 for automatically driving a vehicle 100 along a driving trajectory T defining a travelling path for the vehicle 100. As shown in FIG. 3, the control unit 30 may be the same unit as the processing unit 30. In this context, the control unit 30 typically requires to be in communicative contact with the at least one perception sensor 10. In order to be able to automatically drive the vehicle, the vehicle 100 may further comprise at least one actuator (not shown) for executing vehicle manoeuvres.

The control unit 30 is configured to issue one or more control signals to the at least one actuator so that the at least one actuator executes one or more vehicle manoeuvres to follow the driving trajectory T, wherein the driving trajectory T has been planned by a processing unit 30 according to an embodiment of the second aspect of the invention.

The vehicle 100 may as mentioned comprise the processing unit 30 and/or the control unit 30. Additionally, or alternatively, the vehicle 100 may be adapted to be in communicative contact with a processing unit according to an embodiment of the second aspect of the invention and/or with a control unit according to an embodiment of the fourth aspect of the invention.

The at least one environment perception sensor 10 as disclosed herein may be any type of environment perception sensor, such as a light detection and ranging (LIDAR) sensor, a radio detection and ranging (RADAR) sensor, a sound navigation and ranging (SONAR) sensor, a camera etc.

The methods as disclosed herein may be implemented as a respective computer program comprising program code means for performing any one of the methods when said program is run on a computer, such as on the processing unit 30 and/or the control unit 30. Therefore, the invention also relates to a computer readable medium carrying a computer program comprising program code means for performing any one of the methods as disclosed herein when said program product is run on a computer, such as on the processing unit 30 and/or the control unit 30.

It is to be understood that the present invention is not limited to the embodiments described above and illustrated in the drawings; rather, the skilled person will recognize that many changes and modifications may be made within the scope of the appended claims.

The invention claimed is:

1. A method for planning a driving trajectory defining a travelling path for a vehicle, wherein the driving trajectory is to be followed by executing one or more vehicle maneuvers and wherein the vehicle comprises at least one environment perception sensor having a limited sensor field of view, the method comprising:

planning the driving trajectory from a first point to a second point, by including at least one additional vehicle maneuver resulting in a deviation from an otherwise expected travelling path from the first point to the second point, so that each section of an area which the vehicle is to pass from the first point to the second point is covered in the limited sensor field of view at least one time during driving from the first point to the second point and at least before passing each respective section.

2. The method according to claim 1, wherein the first point is defined by a start position and orientation of the vehicle and the second point is defined by an end position and orientation of the vehicle.

3. The method according to claim 1, wherein the driving trajectory is planned so that also at least one safety margin section associated with at least one of the respective sections is also covered in the limited sensor field of view at least one time during driving from the first point to the second point and at least before passing the at least one of the respective sections.

4. The method according to claim 1, further comprising:
finding two or more possible driving trajectories from the first point to the second point;
in response to finding two or more possible driving trajectories from the first point to the second point, the method further comprises choosing the fastest and/or shortest driving trajectory from the first point to the second point from the two or more possible driving trajectories.

5. The method according to claim 1, further comprising:
during driving along the planned driving trajectory, replanning the driving trajectory when it is determined that a predetermined time period has lapsed since a last time at least one section of the area which the vehicle is intended to pass was covered in the limited sensor field of view.

6. The method according to claim 5, wherein replanning the driving trajectory comprises including at least one further additional vehicle maneuver resulting in a deviation from the planned driving trajectory so that the at least one section of the area which the vehicle is intended to pass is covered in the limited sensor field of view at least one further time before passing the at least one section.

7. The method according to claim 1, wherein each section of the area which the vehicle is intended to pass from the first point to the second point is considered to be covered in the limited sensor field of view at least one time when each section has been viewed during a predetermined viewing time period of the at least one environment perception sensor and/or when each section has been viewed within a predetermined distance from the at least one environment perception sensor.

8. The method according to claim 1, further comprising:
in response to determining during driving along the planned driving trajectory that at least one section of the area which the vehicle is intended to pass from the first point to the second point comprises an obstacle, replanning the driving trajectory, by including at least one further additional vehicle maneuver deviating from the planned driving trajectory so that the obstacle is avoided.

9. The method according to claim 8, wherein the driving trajectory is further replanned so that each further section of a further area which the vehicle is intended pass as a consequence of the at least one further additional vehicle maneuver is covered in the limited sensor field of view at least one time before and/or during execution of the at least one further additional vehicle maneuver and at least before passing each respective further section.

10. The method according to claim 1, wherein the one or more vehicle maneuvers comprises at least one forward moving vehicle maneuver and at least one reverse moving vehicle maneuver.

11. The method according to claim 10, wherein a vehicle maneuver associated with starting driving from the first point is a forward moving vehicle maneuver and a vehicle maneuver associated with reaching the second point is a reverse moving vehicle maneuver, or vice versa.

12. The method according to claim 1, wherein the driving trajectory is further planned by defining an additional travelling path for the vehicle from the second point to a third point, and wherein the driving trajectory is further planned, by including a vehicle maneuver while driving from the first point to the second point, so that each section of an area which the vehicle is intended to pass from the second point to the third point is covered in the limited sensor field of view at least one time during driving from the first point to the second point.

13. A processing unit for planning a driving trajectory defining a travelling path for a vehicle, wherein the driving trajectory is intended to be followed by execution of one or more vehicle maneuvers and wherein the vehicle comprises at least one environment perception sensor having a limited sensor field of view, the processing unit being configured to perform the steps of the method according to claim 1.

14. A method for automatically driving a vehicle along a driving trajectory defining a travelling path for the vehicle, wherein the vehicle comprises at least one environment perception sensor having a limited sensor field of view, the method comprising:
executing one or more vehicle maneuvers to follow the driving trajectory, wherein the driving trajectory is planned by a method according to claim 1.

15. A control unit for automatically driving a vehicle along a driving trajectory defining a travelling path for the vehicle, wherein the vehicle comprises at least one actuator for executing vehicle maneuvers and at least one environment perception sensor having a limited sensor field of view, wherein the control unit is configured to issue one or more control signals to the at least one actuator so that the at least one actuator executes one or more vehicle maneuvers to follow the driving trajectory, wherein the driving trajectory is planned by a processing unit according to claim 13.

16. A vehicle comprising at least one environment perception sensor having a limited sensor field of view, wherein the vehicle further comprises a processing unit according to claim 13 and/or a control unit, and/or wherein the vehicle is adapted to be in communicative contact with the control unit or the processing unit.

17. A non-transitory computer readable medium carrying a computer program code comprising program code for performing the method of claim 1 when said program code product is run on a computer.

* * * * *